(12) United States Patent
Woltmann

(10) Patent No.: US 6,843,909 B1
(45) Date of Patent: Jan. 18, 2005

(54) THREE-STAGE AQUARIUM FILTRATION

(75) Inventor: Klaus W. Woltmann, Demarest, NJ (US)

(73) Assignee: Imagine Gold, L.L.C., South Hackensack, NJ (US)

( * ) Notice: Subject to any disclaimer, the term of this patent is extended or adjusted under 35 U.S.C. 154(b) by 0 days.

(21) Appl. No.: 10/822,052

(22) Filed: Apr. 9, 2004

(51) Int. Cl.[7] .................. A01K 63/04; B01D 27/00; B01D 25/00; C02F 3/06
(52) U.S. Cl. .................. 210/151; 210/169; 210/202; 210/263; 210/282; 210/485; 119/260
(58) Field of Search .................. 210/150, 151, 210/169, 232, 252, 259, 263, 282, 198.1, 202, 416.2, 485, 488, 489, 903; 119/259, 260

(56) References Cited

U.S. PATENT DOCUMENTS

| | | |
|---|---|---|
| 87,250 A | 2/1869 | Ford |
| 2,408,158 A | 9/1946 | Belsher |
| 3,111,489 A | 11/1963 | Getzin |
| 3,150,945 A | 9/1964 | Baggeson |
| 3,280,984 A | 10/1966 | Sexton |
| 3,378,934 A | 4/1968 | Erickson |
| 3,513,978 A | 5/1970 | Newsteder |
| 3,570,220 A | 3/1971 | Felter |
| 3,881,250 A | 5/1975 | Frederickson |
| 4,427,548 A * | 1/1984 | Quick, Jr. .................. 210/617 |
| 4,483,769 A | 11/1984 | Sherman |
| 4,512,885 A | 4/1985 | Willinger |
| 4,668,394 A | 5/1987 | Badolato et al. |
| 4,732,675 A | 3/1988 | Badolato et al. |
| 4,783,258 A | 11/1988 | Willinger et al. |
| 5,002,660 A | 3/1991 | Sherman et al. |
| 5,075,000 A | 12/1991 | Bernard et al. |
| 5,171,437 A * | 12/1992 | Fletcher, Sr. .................. 210/169 |
| 5,217,616 A * | 6/1993 | Sanyal et al. .................. 210/617 |
| 5,306,421 A * | 4/1994 | Weinstein .................. 210/151 |
| 5,474,673 A * | 12/1995 | Ludlow .................. 210/151 |
| 5,965,016 A * | 10/1999 | Suchowski et al. .................. 210/169 |
| 6,086,755 A * | 7/2000 | Tepper .................. 210/150 |
| 6,692,637 B2 | 2/2004 | Fox et al. |
| 2003/0085167 A1 | 5/2003 | Fox et al. |

OTHER PUBLICATIONS

"Renaissance Canister Filters." Aquarium Fish Magazine, Apr., 1997.
Renaissance Bravo 120/200/300, Power filter System, Instruction Book, Published in or about Oct., 1997.
Renaissance Bravo All–in–One Filter Cartridges, Advertisement, Published in or about Oct., 1997.

* cited by examiner

*Primary Examiner*—Fred G. Prince
(74) *Attorney, Agent, or Firm*—Arthur Jacob

(57) ABSTRACT

A filter unit for filtering aquarium water includes a packet having porous filter walls configured for mechanical filtration of aquarium water, a filter medium within the packet, between the filter walls, configured for chemical filtration of the aquarium water, and a block of reticular material juxtaposed with the packet, the block of reticular material being configured for biological filtration of the aquarium water. The packet and the block are secured within a frame to establish an integrated unit for placement within an aquarium water filtration system in which aquarium water is passed through the packet and the block, and the frame is selectively removed from the filtration system and opened for selective removal and replacement of the packet and the block independent of one another.

19 Claims, 4 Drawing Sheets

THREE-STAGE AQUARIUM FILTRATION

The present invention relates generally to the filtration of aquarium water and pertains, more specifically, to an aquarium water filter unit and method having three stages of filtration, namely, mechanical filtration, chemical filtration and biological filtration.

A growing popularity of aquariums in homes, offices and commercial establishments has led to a demand for products which enable the maintenance of aquariums to be accomplished with increased ease and greater efficacy, as well as with economy. One of the more important aspects of aquarium maintenance is the proper filtration of aquarium water. Many filtration systems have been made available for accomplishing the removal of contaminants from aquarium water, including mechanical filters which essentially strain particulate material from the water, chemical filters which mainly adsorb material from the water, and biological filters which provide for the colonization of aerobic bacteria that remove contaminants through biological activity.

One of the more popular aquarium filtration systems made available commercially is illustrated in U.S. Pat. No. 4,512,885, wherein there is disclosed a housing adapted for mounting upon a wall of an aquarium tank to enable water to be drawn from the tank, passed through a filter unit inserted into the housing, and then returned to the tank as filtered water. Various combinations of filter elements have been suggested for the filter unit utilized in such a system, including mechanical, chemical and biological filter elements.

The present invention provides an improved filter unit which can be inserted into a housing of a filtration system, such as that disclosed in the aforesaid patent, for accomplishing improved mechanical filtration, chemical filtration and biological filtration with increased ease of maintenance, greater efficacy and better economy. As such, the present invention attains several objects and advantages, some of which are summarized as follows: Provides a single, compact filter unit for ready insertion into an aquarium filtration system to accomplish mechanical, chemical and biological filtration of aquarium water; enables increased ease of use of an aquarium filtration system so as to encourage the maintenance of optimum conditions in the aquarium; allows the maintenance of such optimum conditions with greater economy; attains increased efficacy in accomplishing the removal of contaminants from aquarium water utilizing a simplified and relatively inexpensive filter unit; is adapted readily to aquarium filtration systems currently in use for increasing the effectiveness of such existing filtration systems; promotes even wider use of aquariums through simplifying maintenance and reducing the expense of maintaining optimum conditions in an aquarium; provides highly effective mechanical, chemical and biological filter elements arranged in a simple, compact, easily used and economical single filter unit.

The above objects and advantages, as well as further objects and advantages, are attained by the present invention which may be described briefly as a filter unit for filtering aquarium water through three stages of filtration, including mechanical filtration, chemical filtration and biological filtration, the filter unit comprising: a packet having porous filter walls with peripheral edges including longitudinally extending side edges and laterally extending end edges, the filter walls being juxtaposed with one another and configured for mechanical filtration of aquarium water passed in a generally transverse direction through the filter walls; a filter medium interposed between the porous filter walls, the filter medium being configured for chemical filtration of aquarium water passed through the filter walls in the generally transverse direction; a block of reticular material for juxtaposition with the packet in a location wherein aquarium water passed through the filter walls of the packet in the generally transverse direction will be intercepted by the block of reticular material, the block of reticular material being configured for biological filtration of the aquarium water passed through the block; and a frame for securing the packet and the block in juxtaposition with one another in an integrated unit, the frame having transversely opposed frame members including openings distributed longitudinally and laterally throughout the frame members for passing the aquarium water through the frame members to enter and exit the filter unit along the generally transverse direction.

Further, the present invention includes a method for filtering aquarium water through three stages of filtration, including mechanical filtration, chemical filtration and biological filtration, the method comprising: selectively securing within a frame a packet having porous filter walls juxtaposed with one another and configured for mechanical filtration of aquarium water passed through the porous filter walls, and a filter medium interposed between the porous filter walls, the filter medium being configured for chemical filtration of aquarium water passed through the filter walls and the filter medium; and a block of reticular material in juxtaposition with the packet in a location wherein aquarium water passed through the filter walls of the packet will be intercepted by the block of reticular material, the block of reticular material being configured for biological filtration of the aquarium water passed through the block; inserting the frame into an aquarium water filtration system; filtering aquarium water through the packet and the block; removing the frame from the filtration system; selectively removing the packet from the frame when the packet no longer serves effectively to mechanically filter aquarium water; replacing the removed packet with a fresh packet, and securing the fresh packet in the frame; and replacing the frame, with the fresh packet secured therein, in the filtration system.

Still further, the present invention provides a method for filtering aquarium water through three stages of filtration, including mechanical filtration, chemical filtration and biological filtration, the method comprising: selectively securing within a frame a packet having porous filter walls juxtaposed with one another and configured for mechanical filtration of aquarium water passed through the porous filter walls, and a filter medium interposed between the porous filter walls, the filter medium being configured for chemical filtration of aquarium water passed through the filter walls and the filter medium; and a block of reticular material in juxtaposition with the packet in a location wherein aquarium water passed through the filter walls of the packet will be intercepted by the block of reticular material, the block of reticular material being configured for biological filtration of the aquarium water passed through the block; inserting the frame into an aquarium water filtration system; filtering aquarium water through the packet and the block; removing the frame from the filtration system; selectively removing the block from the frame when the block no longer serves effectively to biologically filter aquarium water; replacing the removed block with a fresh block, and securing the fresh block in the frame; and replacing the frame, with the fresh block secured therein, in the filtration system.

The present invention will be understood more fully, while still further objects and advantages will become apparent, in the following detailed description of preferred embodiments of the invention illustrated in the accompanying drawing, in which.

Figure 1:
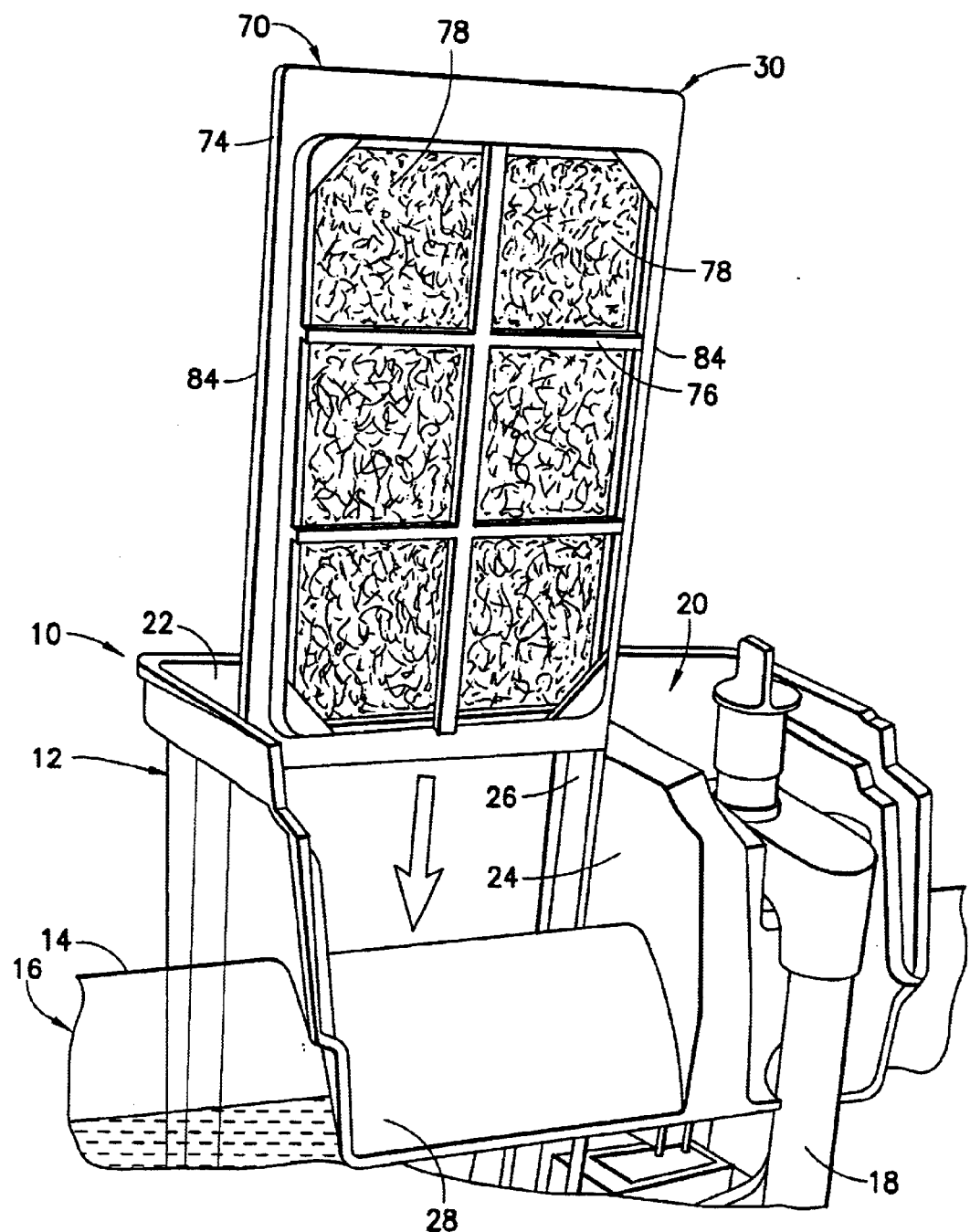
FIG. 1 is a pictorial perspective view showing a filter unit constructed in accordance with the present invention, with the filter unit being placed into use in an aquarium filtration system in connection with a method of the present invention.
Figure 2:
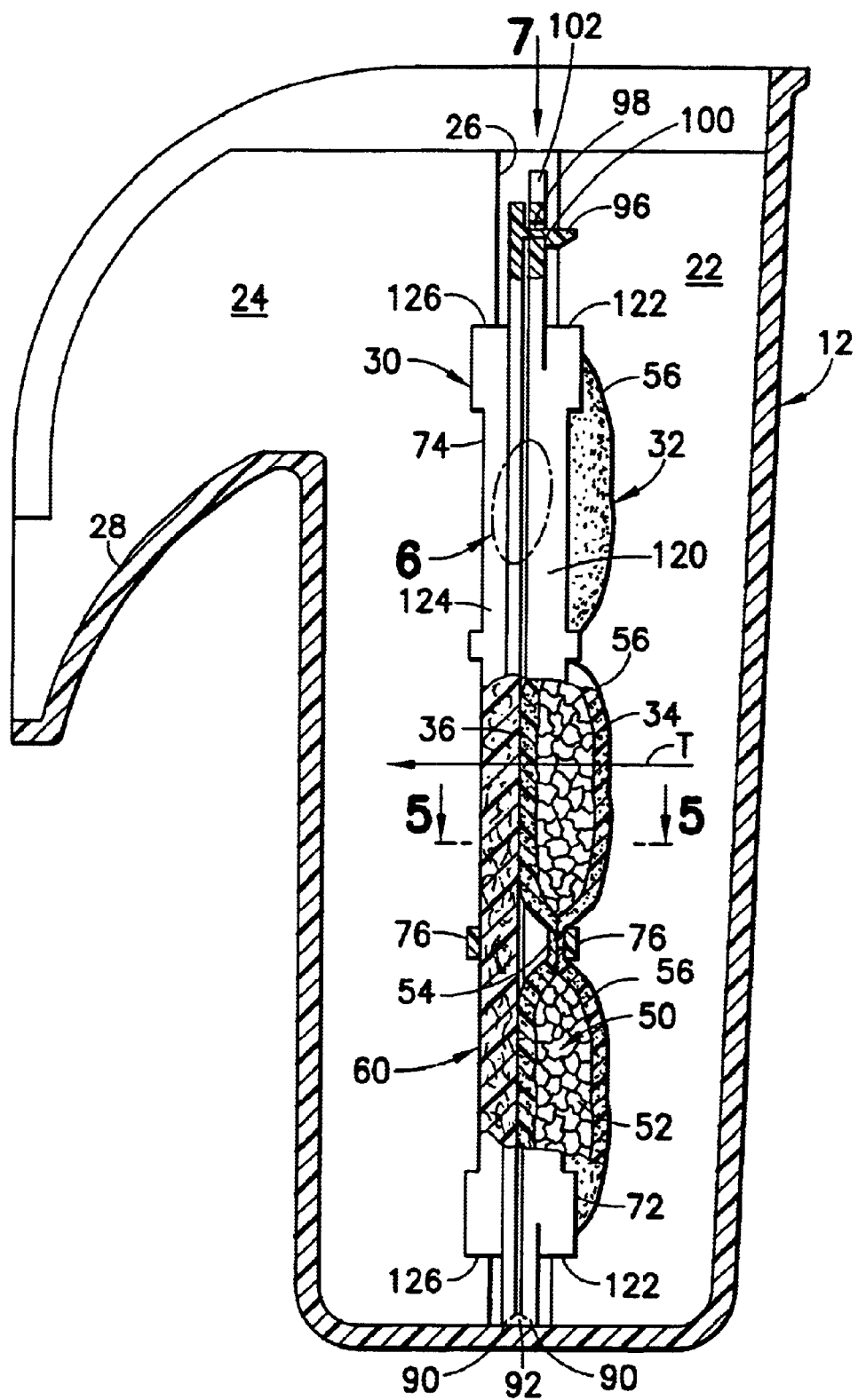
FIG. 2 is an elevational, partially cross-sectional view of the filter unit placed within the filtration system.

Referring now to the drawing, and especially to FIGS. 1 and 2 thereof, an aquarium filtration system 10 includes a housing 12 mounted upon a wall 14 of an aquarium tank 16. Aquarium water is drawn from the interior of aquarium tank 16 through an inlet tube 18, in the manner described in the aforesaid U.S. Pat. No. 4,512,885, the disclosure of which is incorporated herein by reference thereto, and is directed to a chamber 20. Aquarium water from the chamber 20 is fed to an inlet section 22 of housing 12 for being passed to an outlet section 24, and grooves 26 extend longitudinally along a division between sections 22 and 24. An overflow spillway 28 leads from outlet section 24 of housing 12 back to the interior of the aquarium tank 16.

A filter unit 30 is constructed in accordance with the present invention and is inserted between the inlet section 22 and the outlet section 24 of the housing 12, as illustrated in FIG. 2, so that aquarium water drawn from the interior of aquarium tank 16 is supplied to the chamber 20, fed to the inlet section 22, and is passed through the filter unit 30 in a transverse direction T to enter the outlet section 24, and then is returned, through overflow spillway 28, to the interior of the aquarium tank 16.

Figure 3:
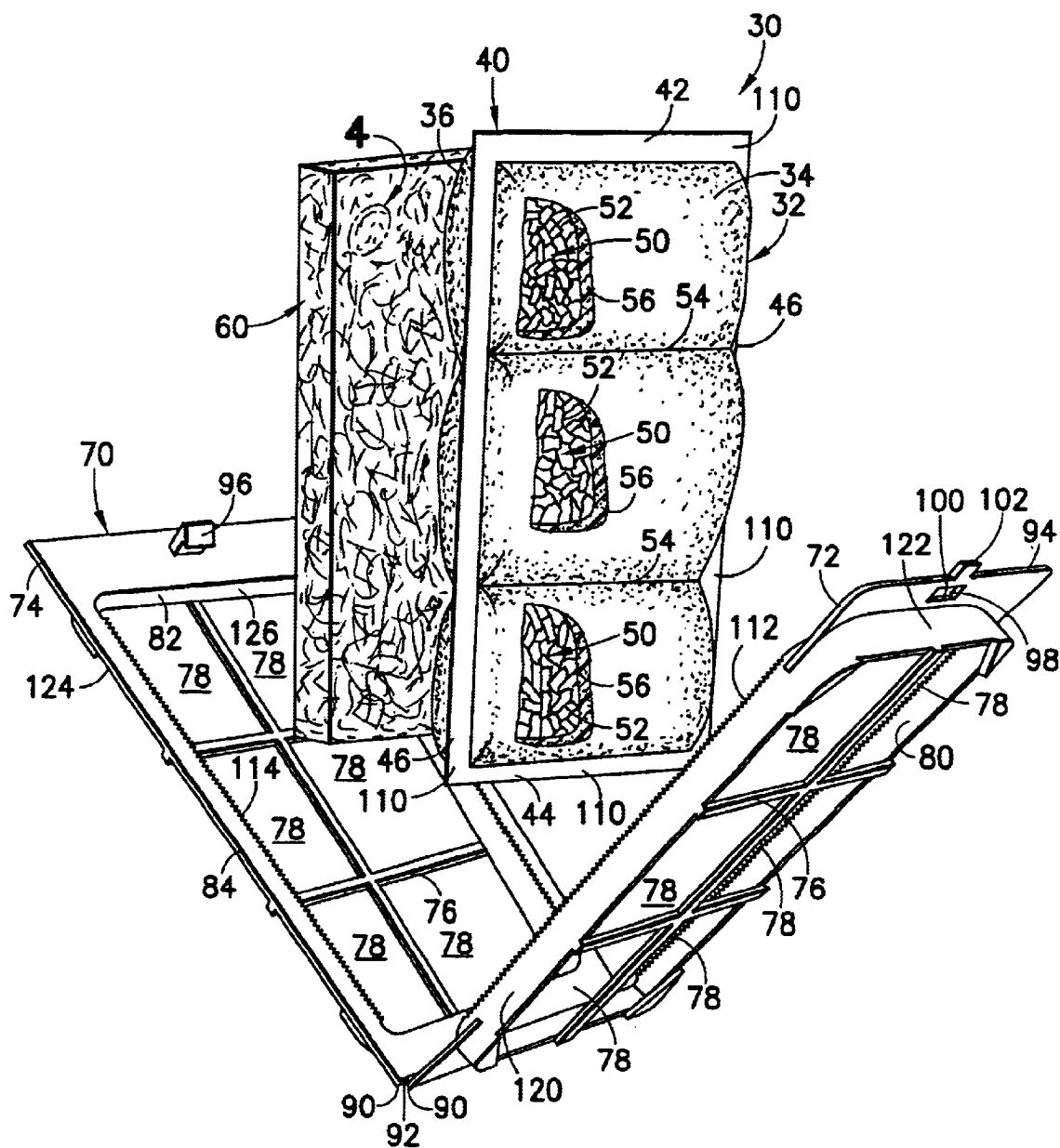
FIG. 3 is an exploded perspective view of the filter unit.

As best seen in FIGS. 2 and 3, filter unit 30 provides three stages of filtration, namely, mechanical filtration, chemical filtration, and biological filtration. Aquarium water from inlet section 22 passes first through a packet 32 having a first porous filter wall 34 and a second porous filter wall 36 juxtaposed with one another over the area of each wall 34 and 36. Walls 34 and 36 are configured for mechanical filtration of the aquarium water; that is, each wall 34 and 36 is constructed of a porous filter material, such as a polyester floss, having a porosity chosen for screening out particulate material in a manner now well known in aquarium filters. The walls 34 and 36 are joined together along the periphery 40 of the packet 32, as by stitching or welding the material of walls 34 and 36 along longitudinally opposite upper and lower end edges 42 and 44, respectively, and laterally opposite side edges 46 of the periphery 40, to close and seal the interior of packet 32.

A filter medium 50 is interposed between walls 34 and 36 and is configured for chemical filtration of the aquarium water; that is, filter medium 50 is comprised of a material which adsorbs chemical contaminants carried by the aquarium water. In the illustrated embodiment, filter medium 50 is comprised of granules 52 of activated carbon and adsorbs dissolved contaminants and discolorations from the aquarium water passed through packet 32. Granules 52 are sealed within the interior of packet 32 by virtue of the sealed periphery 40, and more particularly the sealed longitudinally opposite upper and lower edges 42 and 44 and laterally opposite side edges 46. The opposite walls 34 and 36 are joined together at spaced locations 54, as by stitching or welding, to establish separate, sealed cells 56 so as to assure that the granules 52 of filter medium 50 are distributed essentially throughout the packet 32. In this manner, an unwanted accumulation of granules 52 adjacent the lower edge 44, known as a "tea bag effect", is precluded.

Figure 4:
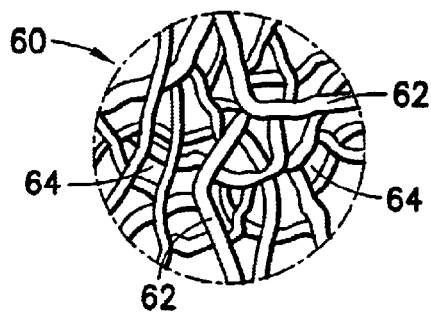
FIG. 4 is an enlarged fragmentary view taken in the area indicated by the arrow 4 in FIG. 3.

Biological filtration is provided by a block 60 of reticulated material juxtaposed with packet 32, downstream of packet 32. Block 60 is configured for biological filtration; that is, as illustrated in FIG. 4, the block 60 is constructed of a synthetic polymeric material having a multiplicity of surface areas 62 for contact by aquarium water passing through interstices 64 between the surface areas 62. The surface areas 62 provide sites for the colonization of aerobic bacteria which remove contaminants from the aquarium water by bacteriological action. For example, ammonia and nitrites which, if unchecked, are able to kill fish are removed by bacteriological action. Block 60 is advantageously constructed of a polyether foam having a reticular structure with a density of about twenty pores per inch. The reticular structure provides interstices 64 sufficient to permit the flow of aquarium water through block 60, while exposing the flowing water to bacteria at surface areas 62.

Figure 5:
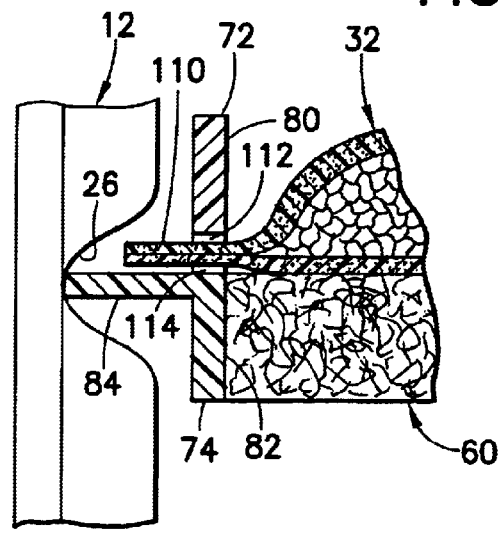
FIG. 5 is an enlarged fragmentary cross-sectional view taken along line 5—5 of FIG. 2.

Packet 32 and block 60 are secured within a frame 70 and are held in juxtaposition with one another such that block 60 is contiguous with packet 32 over essentially the entire area of packet 32 exposed to the flow of aquarium water, that area extending longitudinally between opposite end edges 42 and 44 and laterally between opposite side edges 46. Frame 70 includes a first frame member 72 and a second frame member 74, each of which has a grid 76 providing openings 78 for passing aquarium water through filter unit 30 while securing packet 32 and block 60 within frame 70. Frame member 72 includes a first well 80 within which packet 32 is seated, and frame member 74 includes a second well 82 for containing block 60. Frame member 74 carries side rails 84 adapted to fit within corresponding grooves 26 of housing 12, as seen in FIG. 5, when filter unit 30 is in place in housing 12. In the illustrated preferred construction, frame 70 is molded of a synthetic polymeric material, such as polypropylene, in a unitary construction in which frame members 72 and 74 are joined by living hinges 90 extending along a lower end 92 of the frame 70 to establish a "clam shell" configuration, and are fastened together at an upper end 94 by a latch 96 extending from frame member 74 to pass through an aperture 98 in frame member 72 and lock onto a strike 100 at aperture 98. A finger grip 102 assists in the operation of latch 96.

Figure 6:
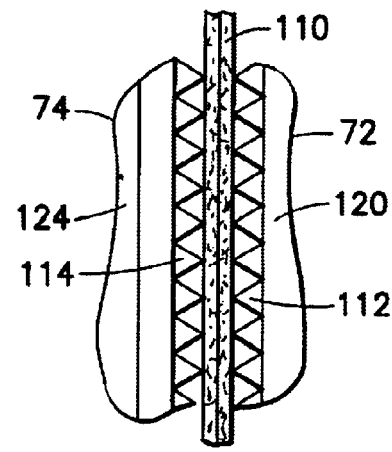
FIG. 6 is an enlarged fragmentary elevational view taken in the area indicated by the arrow 6 in FIG. 2.
Figure 7:
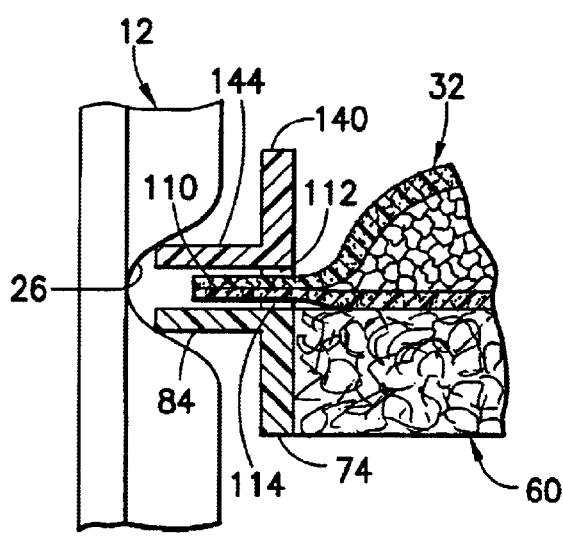
FIG. 7 is an enlarged fragmentary plan view taken in the direction of the arrow 7 in FIG. 2.

In order to assure that packet 32 remains secured in place within frame 70, extending longitudinally and laterally throughout the full area through which aquarium water flows in a direction generally transverse to the longitudinal and lateral directions so as to filter effectively essentially all of the aquarium water flowing from inlet section 22 to outlet section 24, packet 32 is provided with a peripheral flange 110 extending along periphery 40, at least longitudinally along side edges 46, and preferably laterally along end edges 42 and 44 as well, and frame members 72 and 74 include gripping configurations, shown in the form of gripping teeth 112 and 114, for gripping flange 110 to secure packet 32 in place. Thus, gripping teeth 112 are arranged longitudinally along sides 120 and laterally adjacent ends 122 of frame member 72, while gripping teeth 114 are arranged longitudinally adjacent sides 124 of frame member 74 and laterally adjacent ends 126 of frame member 74 such that side portions and end portions of flange 110 are gripped between corresponding opposed teeth 112 and 114 when the frame members 72 and 74 are fastened together by latch 96. Upon latching the frame members 72 and 74 together at latch 96, with packet 32 seated in well 80, the flange 110 is clamped in place between gripping teeth 112 and 114, as seen in FIGS. 6 and 7, so that packet 32 remains in place, extending across the entire area through which aquarium water flows, throughout the service life of packet 32. It is noted that block 60 has sufficient stiffness to remain extended longitudinally and laterally throughout well 82 for fully intercepting the flow of aquarium water as water flows generally transversely through block 60 during service.

During use of filter unit 30 in filtration system 10, packet 32 eventually will become clogged with particulate materials mechanically filtered from the aquarium water and no longer will be effective in mechanically filtering the aquarium water. Such an exhausted packet 32 is removed readily from filter unit 30 merely by withdrawing filter unit 30 from housing 12, unlatching latch 96 to open frame 70 and removing packet 32. Packet 32 is then discarded and replaced by a fresh packet. Since, in the ordinary course of use, it is desirable to retain the colonies of bacteria which have been developed in block 60, block 60 may be retained and reused, while packet 32 is replaced with the fresh packet. It is desirable to retain block 60 for as long a period as possible so as not to disturb the colonies of bacteria which are necessary in accomplishing effective biological filtration. The ability to replace packet 32 independent of block 60 enables increased efficacy with greater economy. However, should block 60 eventually become excessively dirty, it too may be replaced readily, independent of the replacement of packet 32, merely by withdrawing frame 70 from housing 12, and then opening frame 70, removing block 60 and replacing block 60 with a fresh block.

Figure 8:
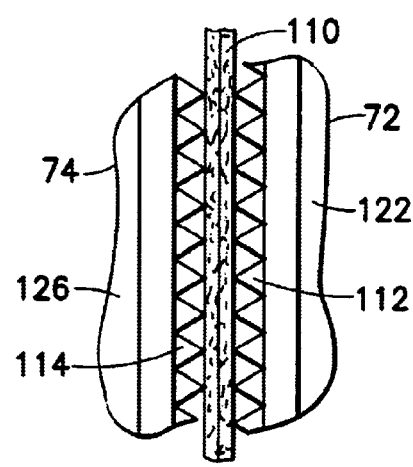
FIG. 8 is an enlarged fragmentary cross-sectional view similar to FIG. 5 and showing an alternate construction.

In an alternate embodiment shown in FIG. 8, frame 70 includes frame member 74 and a frame member 140 having an alternate construction which differs from counterpart frame member 72 of the previously-described embodiment in that frame member 140 includes further side rails 144 adapted to fit within corresponding grooves 26 of housing 12, along with side rails 84, when filter unit 30 is in place in housing 12. In this manner, frame members 74 and 140 are secured together by engagement of side rails 84 and 144 with corresponding grooves 26, as well as by latching the frame members to one another, and the frame 70 itself is seated more snugly within grooves 26.

It will be seen that the present invention attains all of the objects and advantages summarized above, namely: Provides a single filter unit for ready insertion into an aquarium filtration system to accomplish mechanical, chemical and biological filtration of aquarium water; enables increased ease of use of an aquarium filtration system so as to encourage the maintenance of optimum conditions in the aquarium; allows the maintenance of such optimum conditions with greater economy; attains increased efficacy in accomplishing the removal of contaminants from aquarium water utilizing a simplified and relatively inexpensive filter unit; is adapted readily to aquarium filtration systems currently in use for increasing the effectiveness of such existing filtration systems; promotes even wider use of aquariums through simplifying maintenance and reducing the expense of maintaining optimum conditions in an aquarium; provides highly effective mechanical, chemical and biological filter elements arranged in a simple, easily used and economical single filter unit.

It is to be understood that the above detailed description of embodiments of the invention is provided by way of example only. Various details of design, construction and procedure may be modified without departing from the true spirit and scope of the invention as set forth in the appended claims.

The embodiments of the invention in which an exclusive property or privilege is claimed are defined as follows:

1. A filter unit for filtering aquarium water through three stages of filtration, including mechanical filtration, chemical filtration and biological filtration, the filter unit comprising:
   a packet having porous filter walls with peripheral edges including longitudinally extending side edges and laterally extending end edges, the filter walls being juxtaposed with one another and configured for mechanical filtration of aquarium water passed in a generally transverse direction through the filter walls;
   a filter medium interposed between the porous filter walls, the filter medium being configured for chemical filtration of aquarium water passed through the filter walls in the generally transverse direction;
   a block of reticular material for juxtaposition with the packet in a location wherein aquarium water passed through the filter walls of the packet in the generally transverse direction will be intercepted by the block of reticular material, the block of reticular material being configured for biological filtration of the aquarium water passed through the block; and
   a frame for securing the packet and the block in juxtaposition with one another in an integrated unit, the frame having transversely opposed frame members including openings distributed longitudinally and laterally throughout the frame members for passing the aquarium water through the frame members to enter and exit the filter unit along the generally transverse direction.

2. The filter unit of claim 1 wherein the frame members are latched together for selective removal and replacement of the packet and the block, independent of one another.

3. The filter unit of claim 2 wherein the frame members are hinged together for selective opening and closing.

4. The filter unit of claim 3 wherein the frame is molded of a synthetic polymeric material in a unitary construction wherein the frame members are hinged together at a living hinge.

5. The filter unit of claim 1 wherein the filter medium comprises granules of filter medium.

6. The filter unit of claim 5 wherein the granules comprise activated carbon.

7. The filter unit of claim 5 wherein the packet includes a plurality of cells distributed at least longitudinally along the packet for maintaining the filter medium distributed longitudinally along the packet.

8. The filter unit of claim 7 wherein the granules comprise activated carbon.

9. The filter unit of claim 1 wherein the block is seated within the frame contiguous with the packet.

10. The filter unit of claim 1 wherein the frame includes side rails extending longitudinally along laterally opposite sides of the frame for selective engagement with generally complementary grooves in an aquarium filtration system in which aquarium water is circulated through the filter unit when the filter unit is placed in the aquarium filtration system.

11. The filter unit of claim 1 wherein the packet includes side flanges extending along the side edges of the packet, and the frame members include a gripping configuration along laterally opposite sides of the frame for gripping corresponding side flanges of the packet to secure the side edges of the packet in place within the frame while aquarium water is passed through the packet.

12. The filter unit of claim 11 wherein the gripping configuration includes gripping teeth arranged for engaging the side flanges of the packet.

13. The filter unit of claim 11 wherein the packet includes end flanges extending along the end edges of the packet, and the frame members include a gripping configuration along longitudinally opposite ends of the frame for gripping corresponding end flanges of the packet to secure the end edges of the packet in place within the frame while aquarium water is passed through the packet.

14. The filter unit of claim 13 wherein the gripping configuration includes gripping teeth arranged for engaging the end flanges of the packet.

15. The filter unit of claim 1 wherein the packet includes a peripheral flange extending along the peripheral edges of the packet, and the frame members include a gripping configuration along peripheral portions of the frame members for gripping corresponding portions of the peripheral flange of the packet to secure the portions of the peripheral flange of the packet in place within the frame while aquarium water is passed through the packet.

16. The filter unit of claim 15 wherein the gripping configuration includes gripping teeth arranged for engaging the corresponding portions of the peripheral flange of the packet.

17. A method for filtering aquarium water through three stages of filtration, including mechanical filtration, chemical filtration and biological filtration, the method comprising:

selectively securing within a frame a packet having porous filter walls juxtaposed with one another and configured for mechanical filtration of aquarium water passed through the porous filter walls, and a filter medium interposed between the porous filter walls, the filter medium being configured for chemical filtration of aquarium water passed through the filter walls and the filter medium; and a block of reticular material in juxtaposition with the packet in a location wherein aquarium water passed through the filter walls of the packet will be intercepted by the block of reticular material, the block of reticular material being configured for biological filtration of the aquarium water passed through the block;

inserting the frame into an aquarium water filtration system;

filtering aquarium water through the packet and the block;

removing the frame from the filtration system;

selectively removing the packet from the frame when the packet no longer serves effectively to mechanically filter aquarium water;

replacing the removed packet with a fresh packet, and securing the fresh packet in the frame; and replacing the frame, with the fresh packet secured therein, in the filtration system.

18. The method of claim 17 including selectively removing the block from the frame when the block no longer serves effectively to biologically filter aquarium water, subsequent to removing the frame from the filtration system, replacing the removed block with a fresh block, and securing the fresh block in the frame, prior to replacing the frame in the filtration system.

19. A method for filtering aquarium water through three stages of filtration, including mechanical filtration, chemical filtration and biological filtration, the method comprising:

selectively securing within a frame a packet having porous filter walls juxtaposed with one another and configured for mechanical filtration of aquarium water passed through the porous filter walls, and a filter medium interposed between the porous filter walls, the filter medium being configured for chemical filtration of aquarium water passed through the filter walls and the filter medium; and a block of reticular material in juxtaposition with the packet in a location wherein aquarium water passed through the filter walls of the packet will be intercepted by the block of reticular material, the block of reticular material being configured for biological filtration of the aquarium water passed through the block;

inserting the frame into an aquarium water filtration system;

filtering aquarium water through the packet and the block;

removing the frame from the filtration system;

selectively removing the block from the frame when the block no longer serves effectively to biologically filter aquarium water;

replacing the removed block with a fresh block, and securing the fresh block in the frame; and replacing the frame, with the fresh block secured therein, in the filtration system.

* * * * *